(12) United States Patent
Pearce et al.

(10) Patent No.: US 12,389,982 B2
(45) Date of Patent: Aug. 19, 2025

(54) CUSHIONS AND SHOE INSOLES COMPRISING ELASTOMERIC MATERIAL AND METHODS OF FORMING SAME

(71) Applicant: Purple Innovation, LLC, Alpine, UT (US)

(72) Inventors: Tony M. Pearce, Alpine, UT (US); Terry V. Pearce, Alpine, UT (US); Russell B. Whatcott, Eagle Mountain, UT (US); Shawn David Moon, Cedar Hills, UT (US); Dhyey Acharya, Alpine, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

(21) Appl. No.: 15/700,786

(22) Filed: Sep. 11, 2017

(65) Prior Publication Data

US 2019/0075884 A1    Mar. 14, 2019

(51) Int. Cl.
  *A43B 17/00*  (2006.01)
  *A43B 7/06*  (2006.01)
  (Continued)

(52) U.S. Cl.
  CPC .......... *A43B 13/122* (2013.01); *A43B 7/06* (2013.01); *A43B 13/12* (2013.01); *A43B 13/125* (2013.01);
  (Continued)

(58) Field of Classification Search
  CPC .. A43B 7/06; A43B 7/08; A43B 7/087; A43B 13/386; A43B 17/006; A43B 17/02
  (Continued)

(56) References Cited

U.S. PATENT DOCUMENTS 3,253,355 A * 5/1966 Menken .................. A43B 13/20
                                                    36/29
3,256,621 A * 6/1966 Linton ..................... A43B 7/06
                                                    36/3 B
(Continued)

FOREIGN PATENT DOCUMENTS

CA        2008354 A1    7/1990
CN     101492563 A      7/2009
(Continued)

OTHER PUBLICATIONS

European Patent Office, "European Search Report," European Application No. 18193646.9, Apr. 2, 2019, 7 pages.
(Continued)

*Primary Examiner* — Marie D Bays
(74) *Attorney, Agent, or Firm* — Foley & Lardner LLP

(57) ABSTRACT

An insole for a shoe includes an insole body of elastomeric material having a first major surface and a second major surface opposite the first major surface. A distance between the first major surface and the second major surface is between about 1 mm and about 10 mm. The elastomeric material defines a plurality of voids extending through the elastomeric material from the first major surface to the second major surface. Each void has a dimension between about 1 mm and about 3 mm in a plane parallel at least one of to the first major surface and the second major surface. A minimum distance between adjacent voids is between about 0.5 mm and about 3 mm. A shoe insole includes such a cushion. A method of forming an insole for a shoe includes providing an elastomeric material within a mold to form an insole body of elastomeric material.

15 Claims, 9 Drawing Sheets

(51) Int. Cl.
  *A43B 13/12* (2006.01)
  *A43B 13/38* (2006.01)
  *A43B 17/02* (2006.01)
  *A43B 17/14* (2006.01)
  *B29D 35/00* (2010.01)
  *B29D 35/12* (2010.01)
  *B29D 35/14* (2010.01)

(52) U.S. Cl.
  CPC .......... *A43B 13/386* (2013.01); *A43B 17/006* (2013.01); *A43B 17/02* (2013.01); *A43B 17/026* (2013.01); *A43B 17/14* (2013.01); *B29D 35/0009* (2013.01); *B29D 35/122* (2013.01); *B29D 35/142* (2013.01)

(58) Field of Classification Search
  USPC ........................ 36/3 R, 3 B, 28, 30 R, 43, 44
  See application file for complete search history.

(56) References Cited

U.S. PATENT DOCUMENTS

| | | | |
|---|---|---|---|
| 3,997,151 A | 12/1976 | Leingang | |
| 4,185,402 A * | 1/1980 | Digate | A43B 1/0045 36/3 B |
| 4,257,176 A * | 3/1981 | Hartung | A43B 17/102 36/3 B |
| 4,369,284 A | 1/1983 | Chen | |
| 4,619,055 A * | 10/1986 | Davidson | A43B 7/146 36/28 |
| 4,642,912 A | 2/1987 | Wildman et al. | |
| 5,110,660 A | 5/1992 | Wolf et al. | |
| 5,749,111 A | 5/1998 | Pearce | |
| 5,799,413 A * | 9/1998 | Argyris | A43B 7/00 36/141 |
| 5,994,450 A | 11/1999 | Pearce | |
| 6,012,236 A * | 1/2000 | Pozzobon | A43B 5/0405 36/3 A |
| 6,026,527 A * | 2/2000 | Pearce | A43B 13/04 5/654 |
| 6,187,837 B1 | 2/2001 | Pearce | |
| 6,505,421 B1 * | 1/2003 | Vaz | A43B 3/0026 36/25 R |
| 6,797,765 B2 | 9/2004 | Pearce | |
| 6,835,015 B2 | 12/2004 | Pearce | |
| 6,851,141 B2 | 2/2005 | McMahan | |
| 6,865,759 B2 | 3/2005 | Pearce | |
| 7,000,966 B2 | 2/2006 | Kramarczyk et al. | |
| 7,076,822 B2 | 7/2006 | Pearce | |
| 7,150,113 B2 * | 12/2006 | Vito | B25G 1/01 36/44 |
| 7,157,028 B2 | 1/2007 | Ou | |
| 7,254,840 B2 | 8/2007 | Hammons et al. | |
| 7,614,163 B2 * | 11/2009 | Fujii | A43B 7/08 36/28 |
| 7,665,159 B2 | 2/2010 | Fowkes | |
| 7,730,566 B2 | 6/2010 | Flick et al. | |
| 7,823,233 B2 | 11/2010 | Flick et al. | |
| 7,827,636 B2 | 11/2010 | Flick et al. | |
| 7,964,664 B2 | 6/2011 | Pearce | |
| 8,434,748 B1 | 5/2013 | Pearce et al. | |
| 8,607,387 B2 | 12/2013 | Flick et al. | |
| 8,628,067 B2 | 1/2014 | Pearce et al. | |
| 8,800,171 B1 * | 8/2014 | Khaitan | A43B 17/026 36/28 |
| 8,813,391 B1 * | 8/2014 | Khaitan | A43B 21/00 36/28 |
| 8,919,750 B2 | 12/2014 | Pearce et al. | |
| 2001/0001903 A1 * | 5/2001 | Di Girolamo | A43B 7/06 36/3 R |
| 2001/0045028 A1 * | 11/2001 | Crane | A43B 7/1415 36/44 |
| 2002/0013407 A1 | 1/2002 | Pearce | |
| 2004/0159015 A1 * | 8/2004 | Dennis | A43B 7/34 36/44 |
| 2005/0248180 A1 | 11/2005 | Campo Barasoain et al. | |
| 2006/0206980 A1 * | 9/2006 | Hammons | A41D 19/01523 2/160 |
| 2006/0277788 A1 | 12/2006 | Fujii | |
| 2006/0288613 A1 | 12/2006 | Lo | |
| 2007/0261268 A1 * | 11/2007 | Nguyen | A43B 7/147 36/44 |
| 2008/0034619 A1 * | 2/2008 | Van Dyck | A43B 3/0031 36/3 B |
| 2008/0110064 A1 | 5/2008 | Liu | |
| 2008/0271340 A1 * | 11/2008 | Grisoni | A43B 7/144 36/43 |
| 2010/0126041 A1 | 5/2010 | Francis | |
| 2010/0205831 A1 * | 8/2010 | Cheskin | A43B 1/0009 36/44 |
| 2010/0293814 A1 | 11/2010 | Skaja et al. | |
| 2011/0047819 A1 | 3/2011 | Pelletier | |
| 2011/0076457 A1 | 3/2011 | Reichwein et al. | |
| 2011/0209360 A1 | 9/2011 | Baker et al. | |
| 2012/0244312 A1 | 9/2012 | Pearce et al. | |
| 2013/0111836 A1 | 5/2013 | Masanek, Jr. et al. | |
| 2014/0183789 A1 | 7/2014 | Whatcott et al. | |
| 2015/0335166 A9 | 11/2015 | Pearce et al. | |
| 2016/0003318 A1 | 1/2016 | Wood | |
| 2016/0007671 A1 * | 1/2016 | Prust | A47C 27/144 2/411 |
| 2016/0039162 A1 | 2/2016 | Murphy et al. | |
| 2016/0345667 A1 | 12/2016 | Kohatsu et al. | |
| 2017/0245586 A1 | 8/2017 | Cook et al. | |
| 2019/0075884 A1 * | 3/2019 | Pearce | A43B 13/12 |

FOREIGN PATENT DOCUMENTS

| | | |
|---|---|---|
| DE | 8535344 U1 | 3/1986 |
| EP | 0554449 A1 | 8/1993 |
| GB | 619168 A | 3/1949 |
| JP | S61121107 U | 2/1987 |
| JP | 2006-345886 A | 12/2006 |
| JP | 3166083 U | 2/2011 |
| JP | 2011019788 A | 2/2011 |
| JP | 2017-523928 A | 8/2017 |
| WO | 1989000018 A1 | 1/1989 |
| WO | 2014192516 A1 | 12/2014 |
| WO | 2016191654 A1 | 12/2016 |

OTHER PUBLICATIONS

Australian Patent Office, "Examination Report No. 1," Australian Application No. 2018226458, Jan. 29, 2019.
Japan Patent Office, "Notice of Reasons for Rejection", application No. JP2018-169329, Nov. 25, 2019.
European Patent Office, "Examination Report", European application No. 18193646.9, Dec. 20, 2019.
Canadian Intellectual Property Office, "Examiner's Report", Canadian Application No. 3016790, Jul. 8, 2020.
Japan Patent Office, "Decision of Rejection," Japanese Application No. 2018-169329, Jun. 30, 2020.
Chinese National Intellectual Property Administration, "Notification of the First Office Action," for Chinese application No. 201811053799.5, Aug. 5, 2020.
IP Australia, "Examination Report No. 1", Australian Application No. 2020202869, Dec. 18, 2020.
European Patent Office, Communication pursuant to Article 94(3) EPC, European Application No. 18193646.9, Aug. 11, 2020.
Canadian Intellectual Property Office, Examiner's Report, Canadian Application No. 3016790, Sep. 23, 2019.
IP Australia, "Examination Report No. 2", Australian Application No. 2018226458, Sep. 18, 2019.
Canadian Intellectual Property Office, Examiner's Report, Canadian Application No. 3016790, Jan. 19, 2021.
European Patent Office, Communication under Rule 71(3) EPC, European Application No. 18193646.9, Mar. 23, 2021.
Chinese National Intellectual Property Administration, "Second Office Action," Chinese Application No. 201811053799.5, May 27, 2021.

(56) References Cited

OTHER PUBLICATIONS

Japan Patent Office, "Notice of Reasons for Rejection," Japanese Application No. 2020-183452, Oct. 8, 2021.
Canadian Intellectual Property Office, "Examiner's Report," Canadian Application No. 3016790, Sep. 23, 2021.
Japan Patent Office, "Notice of Reasons for Rejection," Japanese Patent Application No. 2023-067162, May 10, 2024.
Canadian Intellectual Property Office, "Examiner's Requisition," Canadian Patent Application No. 3,016,790, Jun. 17, 2024.
European Patent Office, "Communication pursuant to Article 94(3) EPC," European Application No. 21194154.7, Oct. 13, 2022.
Canadian Intellectual Property Office, "Examiner's Requisition," Canadian Application No. 3,016,790, Apr. 26, 2022.
Canadian Intellectual Property Office, "Examiner's Requisition," Canadian Application No. 3,016,790, Dec. 1, 2022.
China National Intellectual Property Adminstration, "Fourth Office Action," Chinese Application No. 2018110537995, May 5, 2022.
Japan Patent Office, "Office Action," Japanese Application No. 2020-183452, Jun. 7, 2022.
Japan Patent Office, "Office Action," Japanese Application No. 2020-183452, Dec. 16, 2022.
China National Intellectual Property Administration, "Third Office Action," Chinese application No. 201811053799.5, Jan. 4, 2022.
European Patent Office, "Communication pursuant to Article 94(3) EPC," European Application No. 21 194 154.7, May 2, 2023.
Canadian Intellectual Property Office, "Examiner's Requisition," Canadian Application No. 3016790, Jun. 23, 2023.
European Patent Office, "Extended European search report," European Application No. 21194154.7, Jan. 19, 2022.

\* cited by examiner

CUSHIONS AND SHOE INSOLES COMPRISING ELASTOMERIC MATERIAL AND METHODS OF FORMING SAME

FIELD

Embodiments of the present disclosure relate generally to cushions and cushioning materials comprising elastomeric materials.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

For example, cushioning materials may include a foam layer topped with a layer of thermoset elastomeric gel, such as a polyurethane gel or a silicone gel. Because polyurethane gels and silicone gels are generally structurally weak and/or sticky, cushioning materials may include film covering such gels, such as a thin thermoplastic polyurethane film. The film may reinforce the strength of the gel, and may prevent other materials from sticking to the gel, since the film generally adheres to the gel but is not itself sticky.

Gels may be used for cushioning and/or temperature management. Gels may provide cushioning because the gels may hydrostatically flow to the shape of a cushioned object and may tend to relieve pressure peaks. Gels may also reduce stresses from shear. Gels may have high thermal mass and/or thermal conductivity, and may therefore be used for heating (such as in hot packs for sore muscles), cooling (such as in cold packs for sprains or for a feeling of coolness when lying on a mattress or pillow), or maintaining a given temperature (such as in a mattress being used in a warm or cool room). For example, gel may be fused to the top of a mattress core, and a film may cover the gel. As another example, gels may be used as the top layer of a gel-on-foam wheelchair cushion.

A conventional gel layer, with or without a plastic film, may be a barrier to gases (e.g., air, vapors, or other gases). This barrier may cause difficulties such as discomfort, such as when body heat and/or perspiration accumulate between the user's body and the gel layer. Even when a breathable material (such as a cover comprising foam or batting fiber) is disposed between a cushioned object and the gel, gases can only travel laterally through the breathable material. Since gases cannot penetrate the plastic film or the gel, the plastic film or the gel inhibits the flow of the gases away from the cushioned object. When the weight of the cushioned object compresses the breathable material, the lateral gas flow paths may become more constricted.

BRIEF SUMMARY

In some embodiments, an insole for a shoe includes a body including elastomeric material having a first major surface and a second major surface opposite the first major surface. A distance between the first major surface and the second major surface is between about 1 mm and about 10 mm. The elastomeric material defines a plurality of voids extending through the elastomeric material from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

In some embodiments, a method of forming an insole for a shoe includes providing an elastomeric material within a mold to form an insole body of elastomeric material having a first major surface and a second major surface opposite the first major surface. A distance between the first major surface and the second major surface is between about 1 mm and about 10 mm. Portions of the mold occupy a plurality of voids extending through the elastomeric material from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

In certain embodiments, a shoe includes an insole body having a non-gel component and a gel component adjacent the non-gel component. The gel component comprises a body of elastomeric material having a first major surface and a second major surface opposite the first major surface. A distance between the first major surface and the second major surface is between about 1 mm and about 10 mm. The gel component defines a plurality of voids extending through the gel component from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

DETAILED DESCRIPTION

Figure 1:
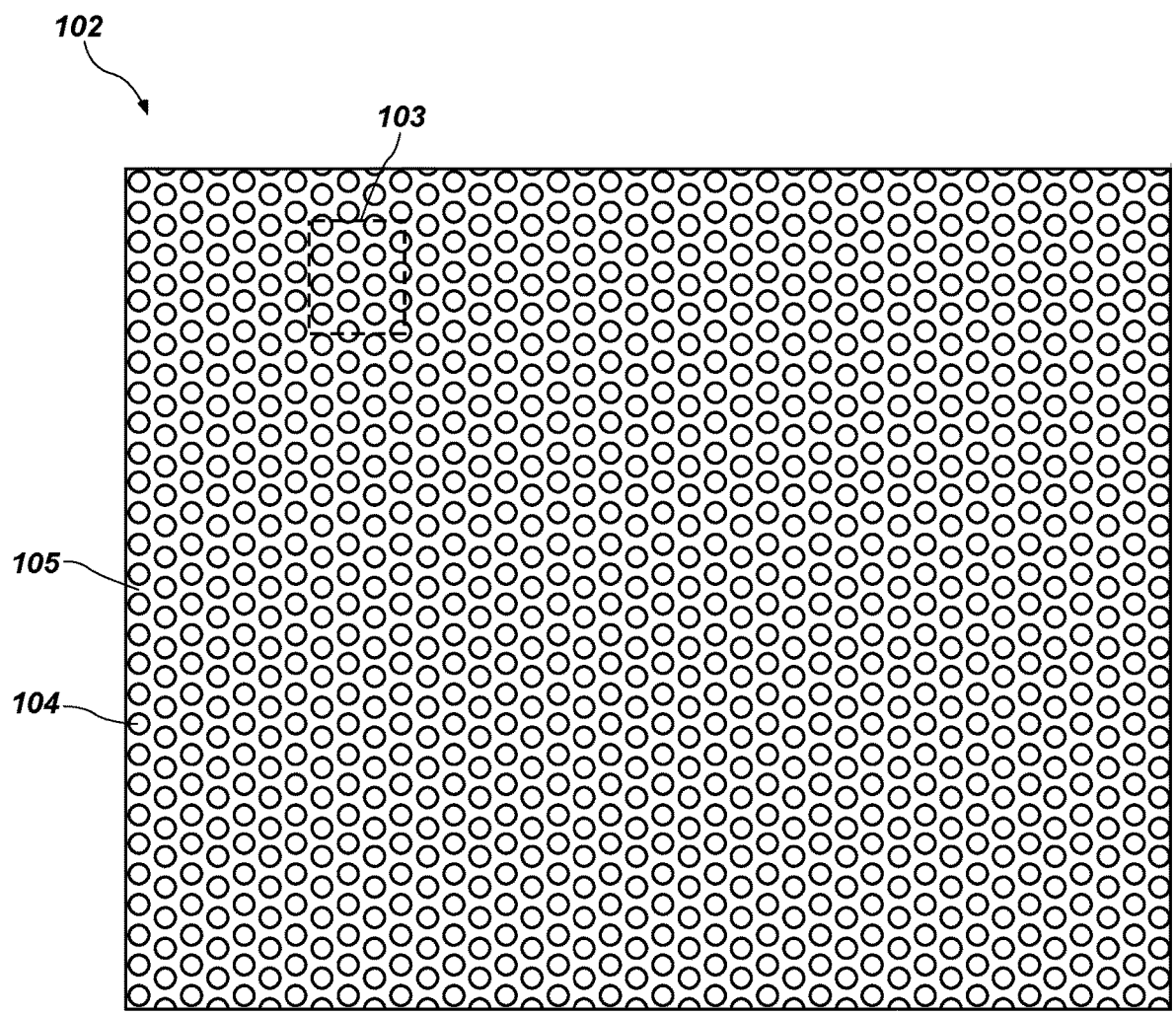
FIG. 1 is a simplified drawing showing a major surface of a cushioning element.

As used herein, the term "cushioning element" means and includes any deformable device intended for use in cushioning one body relative to another. As a non-limiting example, cushioning elements (e.g., seat cushions) include materials intended for use in cushioning the body of a person relative to another object (e.g., a chair seat) that might otherwise abut against the body of the person.

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as "elastomer gels," "gelatinous elastomers," or simply "gels."

As used herein, any relational term, such as "first," "second," "top," "bottom," etc., is used for clarity and convenience in understanding the disclosure and accompanying drawings, and does not connote or depend on any specific preference, orientation, or order, except where the context clearly indicates otherwise.

As used herein, the term "and/or" means and includes any and all combinations of one or more of the associated listed items.

The illustrations presented herein are not actual views of any particular material or device, but are merely idealized representations employed to describe embodiments of the present disclosure. Elements common between figures may retain the same numerical designation.

The present disclosure describes cushioning elements including a gel (i.e., an elastomeric material) having voids extending through the gel. In response to an applied force, the gel may be configured to deform by bulging before the gel can buckle. Buckling occurs when a support member changes shape abruptly. When a support member buckles, the load it applies to a cushioned object decreases. The load on the cushioned object may be transferred to other support members, if any. Buckling is described generally in U.S. Pat. No. 7,730,566, "Multi-walled Gelastic Material," issued Jun. 8, 2010; and U.S. Pat. No. 8,919,750, "Cushioning Elements Comprising Buckling Walls and Methods of Forming Such Cushioning Elements," issued Dec. 30, 2014; the entire disclosure of each of which is hereby incorporated herein by reference. Bulging includes the deformation outward of a material, typically in all directions perpendicular to the applied force. Bugling is described generally in U.S. Pat. No. 3,997,151, "Modular Cushioning Pad," issued Dec. 14, 1976. Cushioning elements that deform by buckling and bulging may be referred to as "semi-buckling, semi-bulging."

Figure 7:
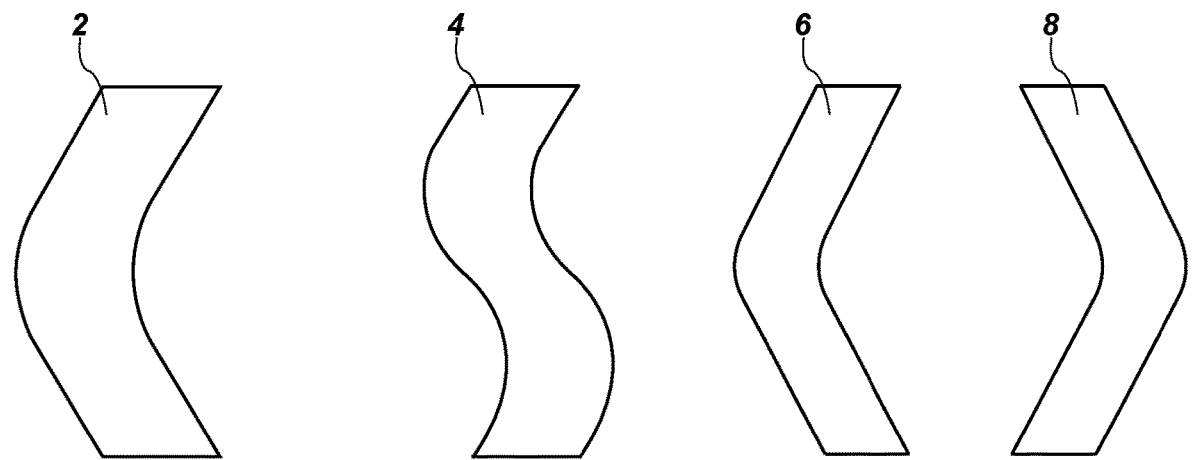
FIG. 7 is a simplified cross-sectional side view illustrating how cushioning elements may buckle.

FIG. 7 illustrates cushioning element members 2, 4, 6, 8 that buckle when a force is applied (i.e., to the top and bottom of the members 2, 4, 6, 8, in the orientation of FIG. 7). For example, member 2 is illustrated buckling approximately in half. Member 4 is illustrated buckling at multiple points, such that a center portion of the member 4 folds over itself. Members 6 and 8 are illustrated buckling outward, in opposite directions as one another. In other embodiments, members may buckle toward one another.

Figure 8:
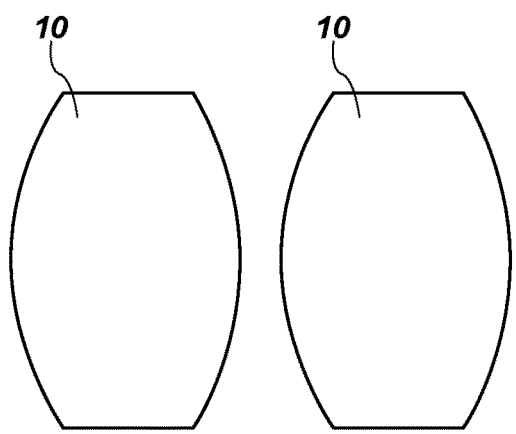
FIG. 8 is a simplified cross-sectional side views illustrating how cushioning elements may bulge.

FIG. 8 illustrates cushioning members 10 that bulge when a force is applied (i.e., to the top and bottom of the members 10, in the orientation of FIG. 8). The cross section of the members 10 increases in the middle as the height of the material shrinks. Cushioning elements disclosed herein may exhibit bulging characteristics. Such cushioning elements may offer enough resistance to withstand relatively high levels of force in a concentrated area.

Figure 2:
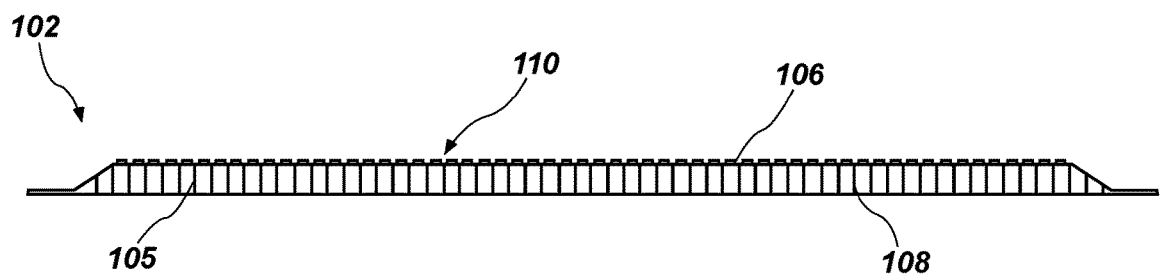
FIG. 2 is simplified cross-sectional side view of the cushioning element shown in FIG. 1.
Figure 3:
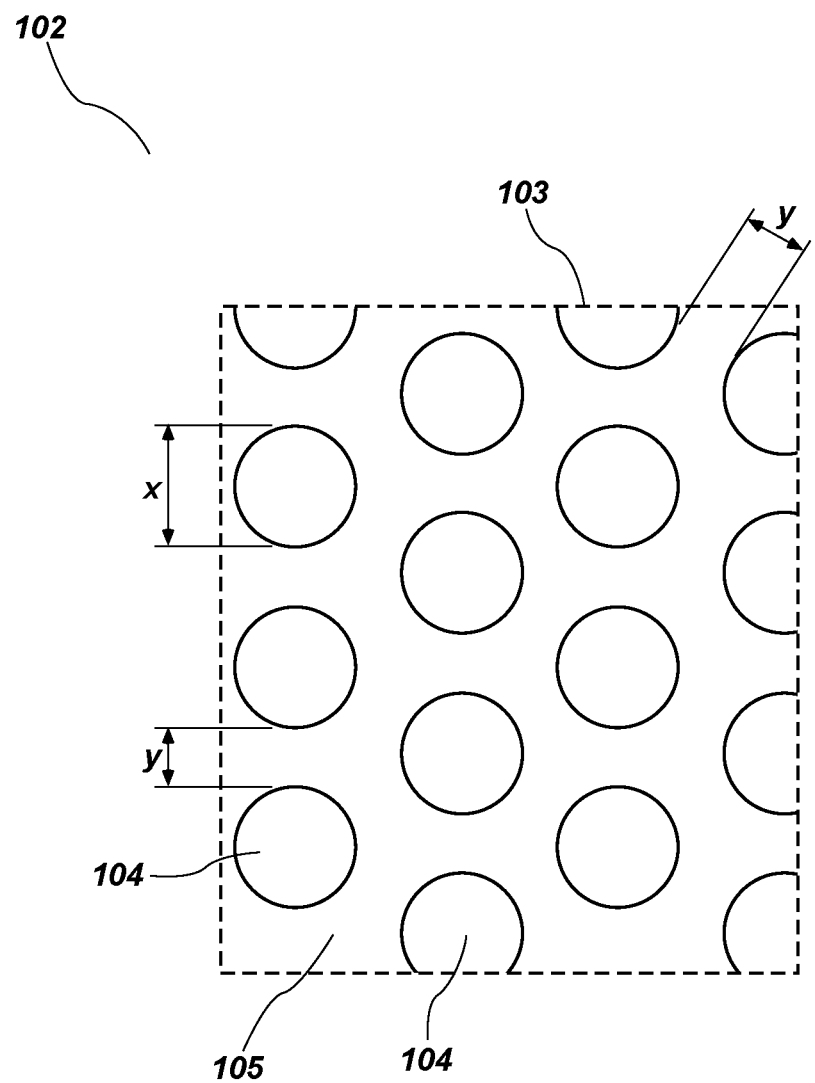
FIG. 3 is an expanded view showing a portion of the cushioning element of FIG. 1.

FIG. 1 is a simplified drawing showing a major surface (e.g., a top or bottom surface) of a cushioning element 102. FIG. 2 is simplified cross-sectional side view of the cushioning element 102. FIG. 3 is an expanded view showing a portion 103 of the cushioning element 102. The cushioning element 102 includes a gel 105 that defines voids 104 extending through the cushioning element 102 from a first major surface 106, referred to for simplicity as a top surface 106, to a second major surface 108, referred to for simplicity as a bottom surface 108. The cushioning element 102 may be in any orientation, and the top surface 106 and bottom surface 108 need to be located at the top and bottom, respectively.

The gel 105 may be a gel or elastomeric material as described in, for example, U.S. Pat. No. 5,994,450, "Gelatinous Elastomer and Methods of Making and Using the Same and Articles Made Therefrom," issued Nov. 30, 1999; U.S. Pat. No. 7,964,664, "Gel with Wide Distribution of MW in Mid-Block" issued Jun. 21, 2011; U.S. Pat. No. 4,369,284, "Thermoplastic Elastomer Gelatinous Compositions" issued Jan. 18, 1983; U.S. Pat. No. 8,919,750, "Cushioning Elements Comprising Buckling Walls and Methods of Forming Such Cushioning Elements," issued Dec. 30, 2014; the entire disclosures of each of which are incorporated herein by this reference. The gel 105 may include an elastomeric polymer and a plasticizer. The gel 105 may be a gelatinous elastomer, a thermoplastic elastomer, a natural rubber, a synthetic elastomer, a blend of natural and synthetic elastomers, etc.

The gel 105 may include an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, TX, under the trade name SEPTON® 4055, and from Kraton Polymers, LLC, of Houston, TX, under the trade names KRATON® E1830, KRATON® G1650, and KRATON® G1651. In these examples, the "A" blocks are styrene. The "B" block may be rubber (e.g., butadiene, isoprene, etc.) or hydrogenated rubber (e.g., ethylene/propylene, ethylene/butylene, ethylene/ethylene/propylene, etc.) capable of being plasticized with mineral oil or other hydrocarbon fluids. The gel 105 may include elastomeric polymers other than styrene-based copolymers, such as non-styrenic elastomeric polymers that are thermoplastic in nature or that can be solvated by plasticizers or that are multi-component thermoset elastomers.

The gel 105 may include one or more plasticizers, such as hydrocarbon fluids. For example, the gel 105 may include aromatic-free food-grade white paraffinic mineral oils, such as those sold by Sonneborn, Inc., of Mahwah, NJ, under the trade names BLANDOL® and CARNATION®.

In some embodiments, the gel 105 may have a plasticizer-to-polymer ratio from about 0.1:1 to about 50:1 by weight. For example, the gel 105 may have a plasticizer-to-polymer ratio from about 1:1 to about 30:1 by weight, or even from about 1.5:1 to about 10:1 by weight. In further embodiments, the gel 105 may have a plasticizer-to-polymer ratio of about 4:1 by weight.

The gel 105 may have one or more fillers (e.g., lightweight microspheres). Fillers may affect thermal properties, density, processing, etc., of the gel 105. For example, hollow microspheres (e.g., hollow glass microspheres or hollow acrylic microspheres) may decrease the thermal conductivity of the gel 105 by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting gel 105 because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). The phase-change material may have a melting point from about 20° C. to about 45° C.

The gel 105 may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., of Iselin, NJ or as EVERNOX®-10, from Everspring Corp. USA, of Los Angeles, CA; octadecyl-3-(3,5-di-tert-butyl-4 -hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS™ 168, from Everspring Chemical. One or more antioxidants may be combined in a single formulation of elastomeric material. The use of antioxidants in mixtures of plasticizers and polymers is described in columns 25 and 26 of U.S. Pat. No. 5,994,450, previously incorporated by reference. The gel 105 may include up to about 5 wt % antioxidants. For instance, the gel 105 may include from about 0.10 wt % to about 1.0 wt % antioxidants.

In some embodiments, the gel 105 may include a resin. The resin may be selected to modify the elastomeric material to slow a rebound of the cushioning element 102 after deformation. The resin, if present, may include a hydrogenated pure monomer hydrocarbon resin, such as those commercially available from Eastman Chemical Company, of Kingsport, TN, under the trade name REGALREZ®. The resin, if present, may function as a tackifier, increasing the stickiness of a surface of the gel 105.

In some embodiments, the gel 105 may include a pigment or a combination of pigments. Pigments may be aesthetic and/or functional. That is, pigments may provide the cushioning element 102 with an appearance appealing to consumers. In addition, a cushioning element 102 having a dark color may absorb radiation differently than a cushioning element 102 having a light color.

The gel 105 may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with four parts by weight of a 70-weight straight-cut white paraffinic mineral oil (e.g., CARNATION® white mineral oil) and, optionally, pigments, antioxidants, and/or other additives.

The gel 105 may include a material that may return to its original shape after deformation, and that may be elastically stretched. The gel 105 may be rubbery in feel, but may deform to the shape of an object applying a deforming pressure better than conventional rubber materials, and may have a durometer hardness lower than conventional rubber materials. For example, the gel 105 may have a hardness on the Shore A scale of less than about 50, from about 0.1 to about 50, or less than about 5.

In an undeformed state, the cushioning element 102 may have a thickness between about 1 mm and about 10 mm. That is, a distance between the top surface 106 and the bottom surface 108 may be between about 1 mm and about 10 mm In some embodiments, the cushioning element 102 may have a thickness between about 1.5 mm and about 7 mm, or between about 2 mm and about 3 mm.

The voids 104 are depicted in FIG. 1 as cylindrical (i.e., having a circular cross-section in the planes of the top surface 106 and the bottom surface 108), but may have any selected shape. For example, the voids 104 may have cross sections that are triangular, square, rectangular, trapezoidal, rhomboidal, hexagonal, squares intermingled with octagons, etc.

As shown in FIG. 3, in an undeformed state, the voids 104 may have a maximum dimension x in the planes of the top surface 106 and the bottom surface 108. For cylindrical voids 104, the maximum dimension x is the diameter. For other shapes, the maximum dimension x may be the length of a side, the length of a diagonal, etc. The maximum dimension x may be between about 1 mm and about 3 mm, such as between about 1.5 mm and about 2.5. In some embodiments, the maximum dimension x may be about 2 mm.

As shown in FIG. 3, in an undeformed state, the voids 104 may be separated by the gel 105, such that a minimum distance y between adjacent voids 104 is between about 0.5 mm and about 3 mm, such as between about 0.8 mm and 1.5 mm. For example, the minimum distance y may be about 1.2 mm.

The distance x+y is the center-to-center distance between adjacent voids 104, which may be between about 1.5 mm and about 6 mm, such as between about 2.0 mm and 4.0 mm. For example, the distance x+y may be about 3.0 mm. The ratio of x to the thickness may be selected to be low enough that the gel 105 does not buckle when a force is applied to the cushioning element 102. That is, thicker cushioning elements 102 may need relatively thicker walls to prevent buckling.

In an undeformed state, each void 104 may have a major axis perpendicular to each of the top surface 106 and the bottom surface 108. For example, if the voids 104 have a circular cross-section, as shown in FIGS. 1 and 3, the voids 104 may be right circular cylinders. The voids 104 may each have a uniform cross-sectional area in each plane parallel to the top surface 106 and/or the bottom surface 108 when the cushioning element 102 is in an undeformed state.

When the cushioning element 102 is in an undeformed state, the volume of the voids 104 may be between about 25% and about 40% of the total volume of the cushioning element 102 (i.e., the volume between the top surface 106 and the bottom surface 108). For example, the volume of the voids 104 may be between about 30% and about 35% of the total volume of the cushioning element 102.

The thickness of the cushioning element 102, the maximum dimension x of the voids 104, and the minimum distance y between adjacent voids 104 may be selected such that when a force is applied to the cushioning element 102 in a direction perpendicular to the top surface 106 (or a force having a component perpendicular to the top surface), a portion of the gel 105 bulges to deform or collapse voids 104 in the vicinity of the applied force before the top surface 106 bottoms out against the bottom surface 108. The voids 104 may be large enough to allow the gel 105 to bulge, but too small for the gel 105 to buckle. Thus, the load on the cushioning element 102 may spread over a larger area, decreasing maximum pressure and increasing comfort (if the cushioned object is a human or other animal).

In some embodiments, the cushioning element 102 may include a non-gel material secured to the gel 105. For example, and as shown in FIG. 2, the cushioning element 102 may include a material 110, such as a fabric, a foam, a polymer sheet, etc. The material 110 may be secured to the gel 105 by an adhesive, or may be melt-bonded or held in place by friction. In certain embodiments, the gel 105 may be secured to the material 110 by overmolding, without physical interlocking of the material 110 and the gel 105.

The cushioning elements 102 may be used, as non-limiting examples, as shoe insoles; shoe midsoles; sock liners; foot beds of any kind; wrist rests; bathroom mats (often referred to as bath mats) for use, for example, near a shower, bathtub, or sink; mats for use near a toilet; mats for use near a kitchen sink (often referred to as kitchen mats); standing mats for cashiers or clerks in retail stores or machinists or other machine attendants in manufacturing (often referred to as anti-fatigue mats); seat cushions; yoga mats; mats for use in kneeling during prayer or religious acts or services (often known as prayer mats); mats for landing in sporting events such as gymnastics or track and field; carpet pad; flooring; area rugs, pads, and mats; zabutons for kneeling or sitting; seat cushions; personal exercise pads; pads for use during weight lifting; martial arts mats; wearable impact pads for sports and martial arts; martial arts pads for punching or kicking; mats for the prevention of injury to the body if the body falls out of bed; mats for use by horses in moving horse trailers; and cushions for shipping sensitive electronic components.

Figure 4:
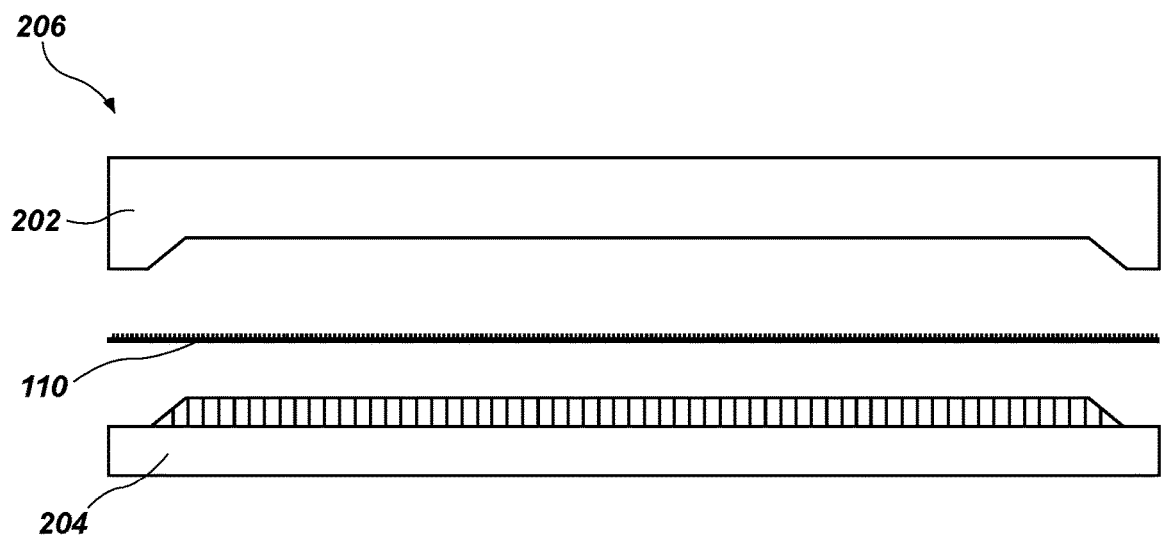
FIGS. 4-6 are simplified cross-sectional side views showing how the cushioning element of FIG. 1 may be formed in a mold.
Figure 5:
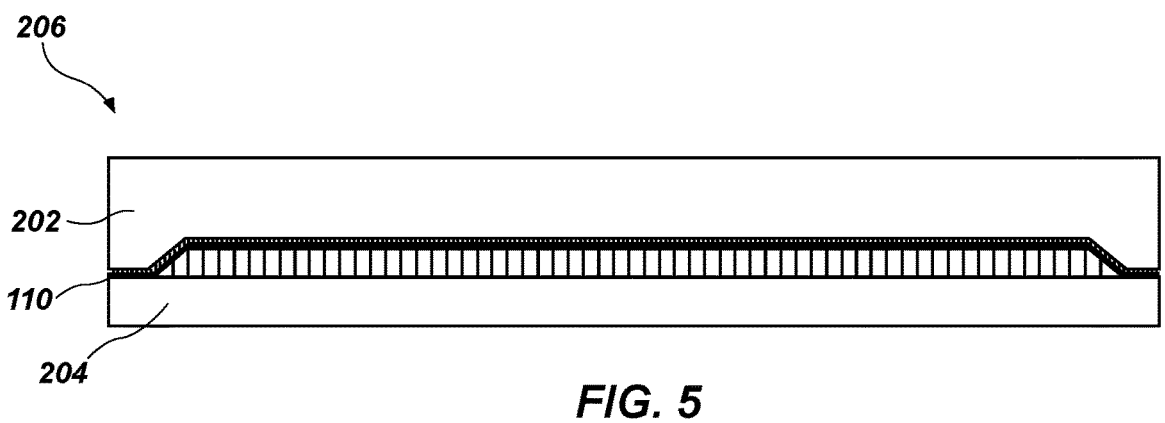

The cushioning element 102 may be formed in a mold structured and adapted to receive a gel material (e.g., a liquid form of the gel 105 or a precursor to the gel 105) and form the gel material into the shape of the cushioning element 102. For example, and as shown in FIG. 4, if the cushioning element 102 to be formed will include a material 110 bonded to gel 105, the material 110 may be placed between sections 202, 204 of a mold 206. The sections 202 may have complementary shapes, such that when the sections 202, 204 are pressed together, as shown in FIG. 5, the material 110 conforms to the shape of the mold 206. The mold 206 may include walls and surfaces configured to define the voids 104 of the cushioning element 102 shown in FIGS. 1 through 3.

A gel material may be provided within the mold 206 to form the cushioning element 102. For example, the gel 105 may formed by heating an A-B-A triblock copolymer and any other components, as described above, and injecting the gel material into the mold 206. Injection molding is described in, for example, U.S. Pat. No. 9,446,542, "Small Footprint Apparatus, Method, and Tooling for Molding Large Thermoplastic Parts," issued Sep. 20, 2016, the entire disclosure of which is incorporated herein by reference. If the mold 206 contains a material 110, molten gel may at least partially penetrate the material 110 (e.g., permeate between fibers of a fabric or permeate pores of a porous material). In some embodiments, the molten gel may penetrate the material 110 entirely, such that the molten gel may flow across the material 110 through the mold 206.

In some embodiments, pressure may be used to assist the gel material to permeate the mold 206, including fibers and/or pores of the material 110 and/or to assist in overmolding adhesion, and to shape the component to a selected end shape. The mold 206 may be used to shape the gel material in the desired final shape of the gel segments or gel pattern as well as the overall shape of the final cushioning element 102. For example, the sections 202, 204 may define a flat interior with beveled edges. In some embodiments, the gel may be molded in such as a way that the molten gel is provided into the mold 206 on the same side of the material 110 as it may reside after cooling. In other embodiments, the molten gel may be provided into the mold 206 in such a way as to pass through the material 110 and into mold cavities on the other side of the material 110, and this passing through may be in part enabled by the porosity of the material 110 or by tearing or otherwise parting the material 110. In some embodiments, an injection molding process may be used to force the gel under pressure into the mold cavities and into the pores of the material 110 or against the material 110 in overmolding.

Figure 6:
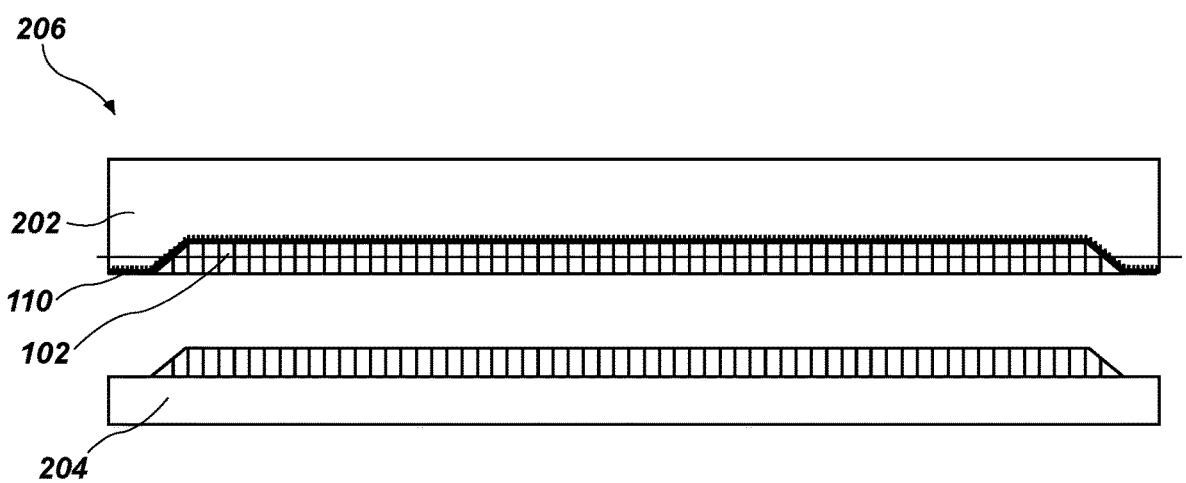

As the gel cools, the gel may bond to the material 110. After the gel cools, the cushioning element 102 may be removed from the mold 206 by separating the sections 202, 204 of the mold 206, as shown in FIG. 6. For example, separation of the sections 202, 204 may leave the cushioning element 102 attached to one section 202. The cushioning element 102 may subsequently be removed from the section 202, as shown in FIG. 2.

In some embodiments, a precursor to the gel 105, formulated to react upon exposure to heat, pressure, humidity, etc., may be provided in the mold 206, and the gel 105 may form within the mold 206. For example, the precursor may include a curative, such that the precursor will cure without exposure to heat, pressure, humidity, etc. The precursor may react to form cross-linking bonds between polymeric chains. Before curing, the precursor may be pourable, such that the mold 206 may be easily filled with elastomeric precursor.

In other embodiments, the gel 105 may be heated and cooled reversibly. In such embodiments, the gel 105 may be provided into the mold 206 in excess of the amount needed to form the cushioning element 102. The gel 105 may be cooled, and the cushioning element 102 and any excess material may be removed from the mold 206. The excess material may be separated from the cushioning element 102, remelted, and reused to form another cushioning element 102 (e.g., by re-injecting the gel 105 into the mold 206). A gel 105 that may be heated and cooled reversibly may be advantageously used because excess material is not wasted. Thus, cushioning elements 102 may be formed with relatively lower average material costs than cushioning elements formed with materials that cannot be reused. Furthermore, the cushioning elements 102 may be formed having higher quality if the gel material can be pushed into and through the mold 206 without regard for wasting excess gel material. That is, flushing gel material through the mold 206 may help to ensure the gel material fills the entire mold 206, without leaving air bubbles (which would tend to form additional voids, which would cause the cushioning element 102 to have different properties). Also, the cushioning elements 102 may be formed with fewer processing steps as compared to conventional cushioning elements, such as by eliminating the need to separately locate and bond the material 110 to the gel 105 after formation thereof.

In some embodiments, the material 110 may be provided in a roll, and the material 110 may be moved as or after injection molding shots are performed. The gel 105 may be configured to be applied with no gaps between shots. In certain embodiments, there may be gel-on-gel overlapping or overmolding so that the gel 105 will be continuous on the material 110 in the rolling direction. For example, a continuous carpet pad or continuous carpet with integral gel pad may be made in this manner.

The material 110 may be trimmed by for example cutting around the exterior of the gel 105, to form a mat. Piping or other binding or sewing may be used to 'trim' the edges of the mat, or it may be left as cut. The cut may be in the material 110 away from the edge of the gel 105, or at the perimeter of the gel 105, or through part of the gel 105, etc. It may be easier to sew piping on if the cut is a slight distance from the gel 105 so that sewing machine needles may not need to penetrate the gel 105. In another embodiment, no fabric or non-gel material is applied between the plates in the molding process, and the molten gel fills the cavity, is cooled in the mold 206, and is removed from the mold 206 as semi-bulging, semi-buckling gel with no other materials.

The overall shape of the mold 206 may advantageously provide benefits and aesthetics. For example, though a mold 206 could be used to make a cushioning element 102 as a flat shoe insole with perpendicular edges, it may be more aesthetic and more comfortable for the user if the edges are beveled or otherwise shaped to not abruptly end in a plane corresponding to the mold opening direction. The force of the molding pressure may form the material 110 into a desired shape which may be part of the mold's cavity shape, and the solidifying of the gel 105 may cause the material 110 to stay generally in that shape when the mold 206 opens. A 45-degree flat bevel may be used, or any other angle, or a curved-surface bevel may be used, or any other edge shape. The cushioning element 102 may not be flat, but may be shaped for any selected use. For example, the cushioning element 102 may include a raised arch support, a heel cup or another contour to accommodate a human foot. Because injection molds (as opposed to poured-gel casting molds) may be shaped to nearly limitless shapes, and because the material 110 may be forced from an original flat shape to conform to the mold's shape and stay there due to permanent stretching during molding and/or the shape of the gel 105 after solidification, cushioning elements 102 formed as described need not be flat on any side, but may have nearly any selected end shape.

It has been a surprising result that the molten gel may in some embodiments be inserted into a mold 206 on the side of the material 110 (often fabric) opposite the side where the gel 105 may reside. The molten gel may also be injected onto the side of the material 110 on which the gel 105 may reside in the finished product. In either case, the molding pressure may be sufficient to partly or fully penetrate the porosity of the material 110 immediately adjacent to the gel 105 of the cushioning element 102.

In some embodiments, the material 110 may be a laminated non-gel component having an outer material (e.g., a non-porous material) laminated to an inner material (e.g., a material porous enough for the gel to penetrate and interlock, or a material to which gel can overmold). Such a laminated material may be formed by any selected method, including adhesive bonding, thermal bonding, welding, etc. In certain embodiments, the outer material may be more porous than the inner material.

For some applications, it may be necessary to cover the gel 105 of the cushioning element 102 on both sides with a non-gel material, such as foam or fabric. For example, a shoe insole may benefit from a bottom scrim layer (i.e., a reinforcement) to maintain the shape of the insole and adhere the insole to surfaces such as a shoe outsole or midsole. A shoe insole may also benefit from a fabric covering on the top of the gel 105 to provide moisture wicking, to guard against dirt or other undesirable substances sticking to the gel 105, and to improve a user's experience in donning or removing a shoe with gel inside (e.g., because the gel can be excessively grippy against socks). In order to achieve layers of covering on both sides of the gel 105, one or both sides of the gel 105 may be laminated using pressure and heat, or one or both sides may be adhered during the molding process.

In some embodiments, where the gel 105 is adhered to another surface, such as a midsole or an outsole, the cushioning element 102 may be glued completely or only in strategic places. For example, if the cushioning element 102 has a stiff scrim on one side to help it maintain its shape, gluing the cushioning element 102 in one place, (e.g., the heel of an insole) may be sufficient to keep the cushioning element 102 in place. This may provide for simplified and less expensive manufacturing processes due to decreased amounts of glue or other adhesive being required, and a smaller surface area on which to manage coverage of the adhesive.

Figure 9:
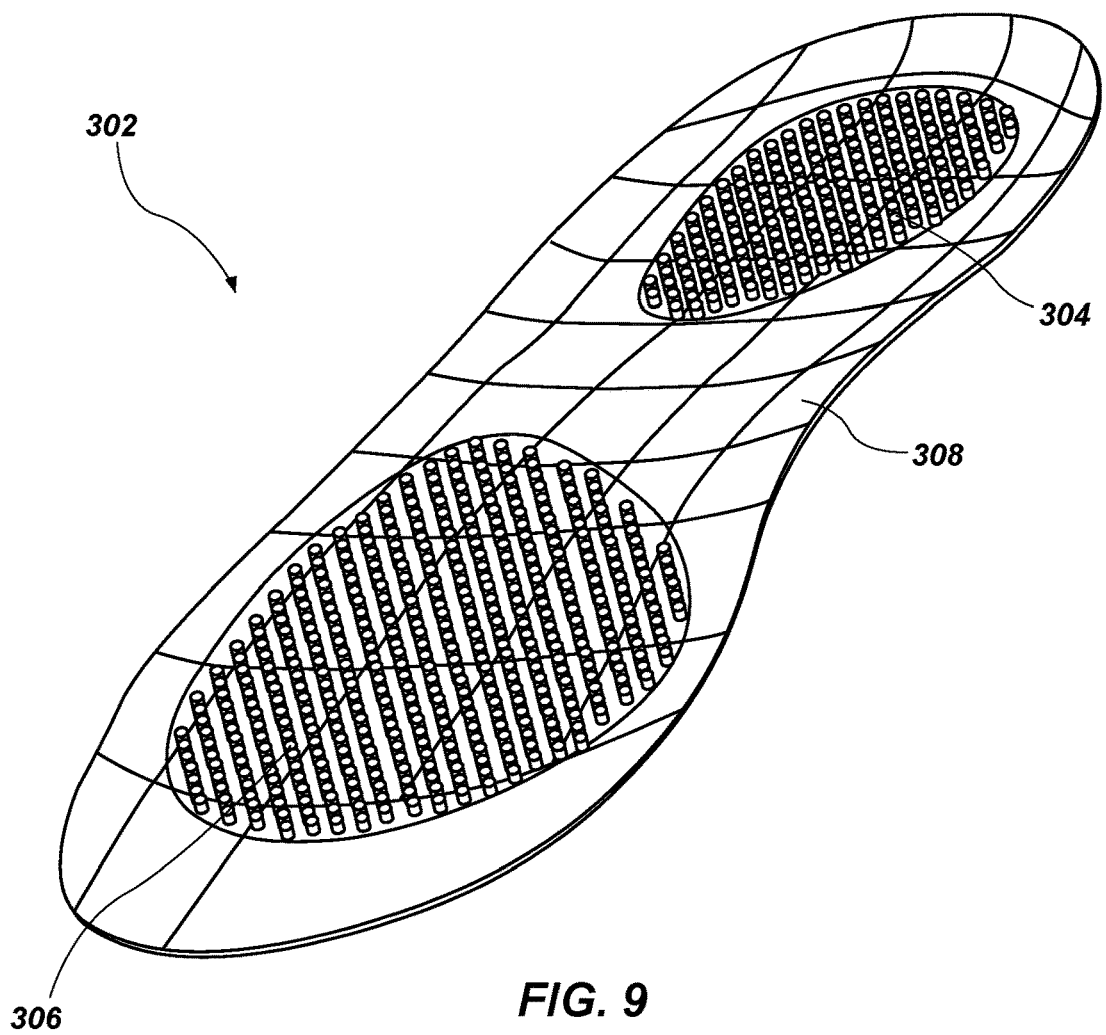
FIG. 9 is a simplified drawing showing an insole for a shoe.
Figure 10:
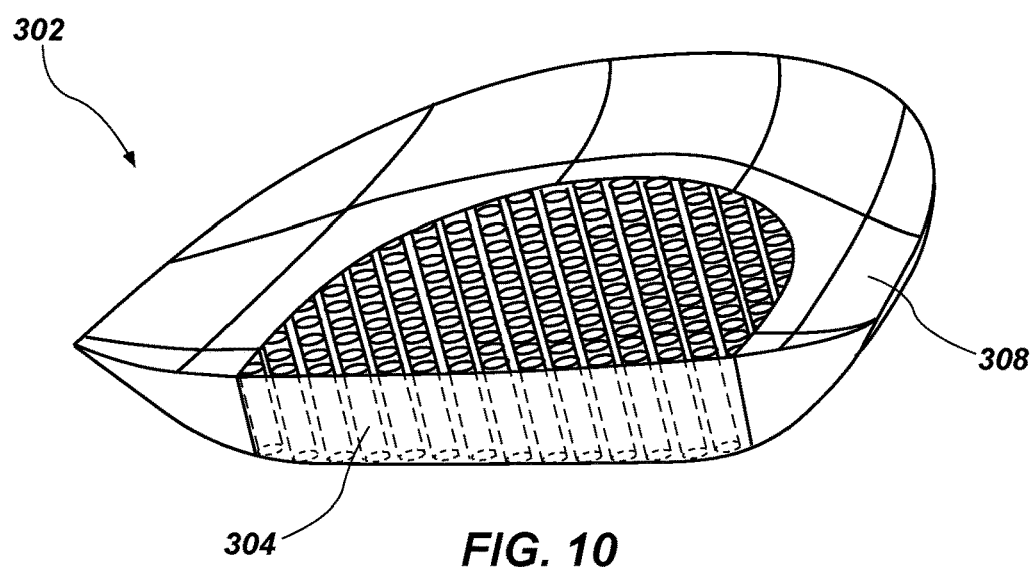
FIG. 10 shows a cross-section of a portion of the insole of FIG. 9 in more detail.

FIG. 9 is a simplified drawing showing an insole 302 for a shoe. The insole 302 includes cushioning elements 304, 306, which may include a gel material as described above. The cushioning elements 304, 306 may be secured within a non-gel component 308. The non-gel component 308 of the insole 302 may include, for example, poly ethylene-vinyl acetate (EVA) or foam. The cushioning elements 304, 306 may be in patches throughout the insole 302, such as in a heel area, an arch area, or other selected portions of the insole 302. For example, the non-gel component 308 may laterally surround each of the cushioning elements 304, 306. In other embodiments, an insole may consist essentially of a gel cushioning element, without a lateral non-gel component (with or without a cover above or below the gel cushioning element). FIG. 10 shows a cross-section of a portion of the insole 302 in more detail. The cushioning element 304 is shown in a center portion of the insole 302, such that the cushioning element 304 may support the majority of the load (i.e., force) of a foot resting on the insole. The edges of the insole 302 may be tapered to fit the shoe, and may carry a relatively small portion of the load under normal use. To fasten the cushioning elements 304, 306 to the non-gel component 308, the cushioning elements 304, 306 may be adhered using an adhesive such as glue. In some embodiments, a cover material, such as a fabric liner, may be adhered over the top of the cushioning elements 304, 306 and fastened to the non-gel component 308 surrounding the cushioning elements 304, 306.

Figure 11:
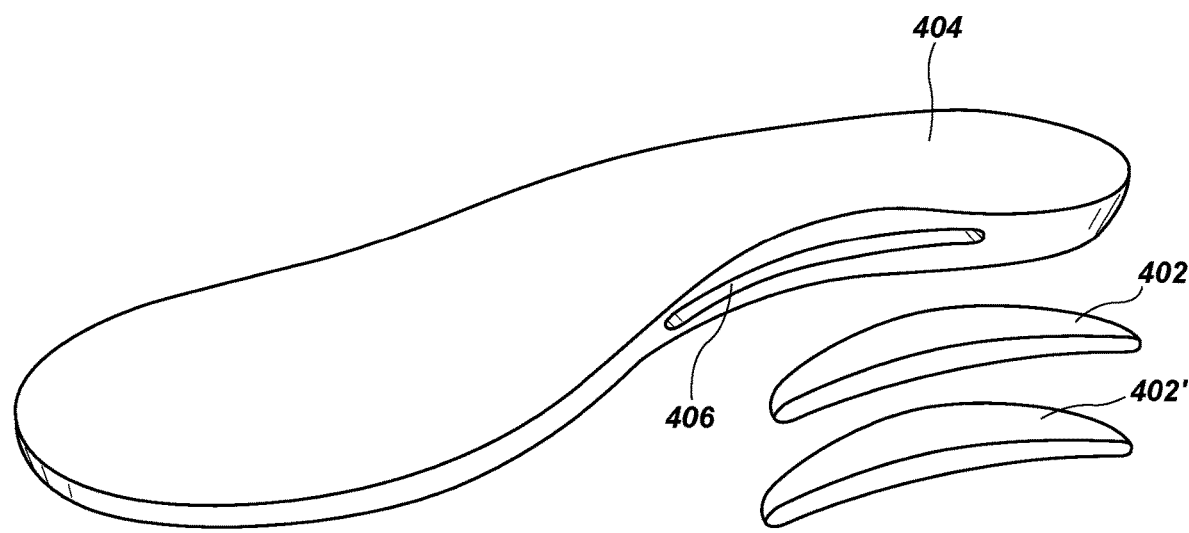
FIG. 11 is a simplified drawing showing an insert for a shoe insole.
Figure 12:
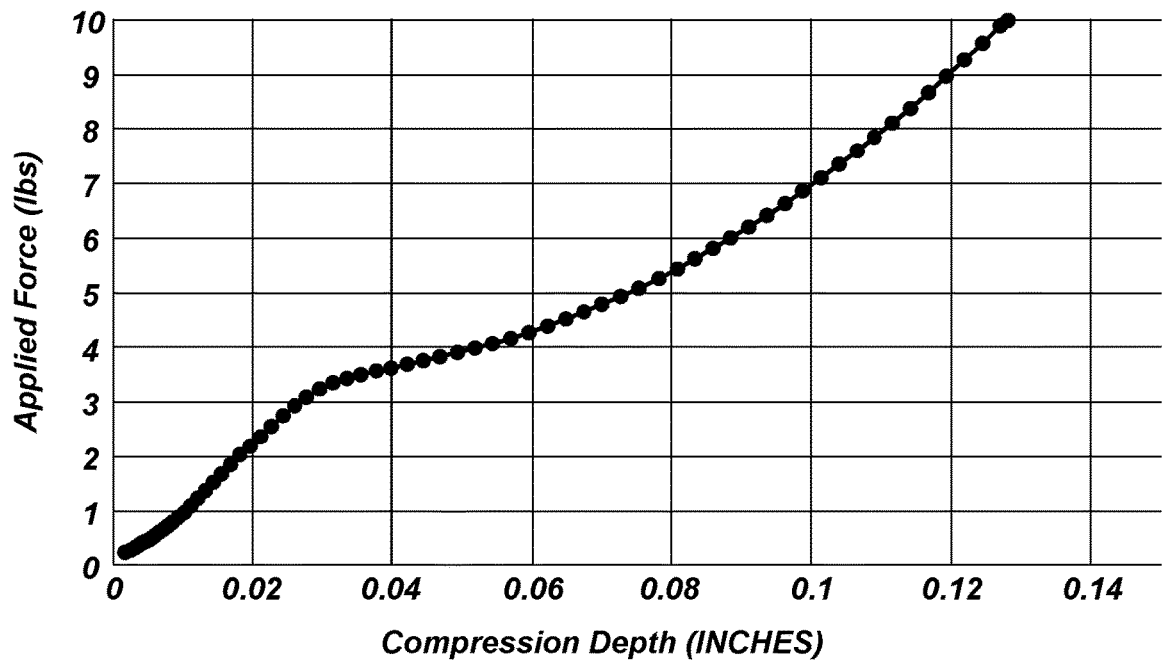
FIGS. 12-14 are graphs illustrating test data obtained from various conventional insoles.
Figure 13:
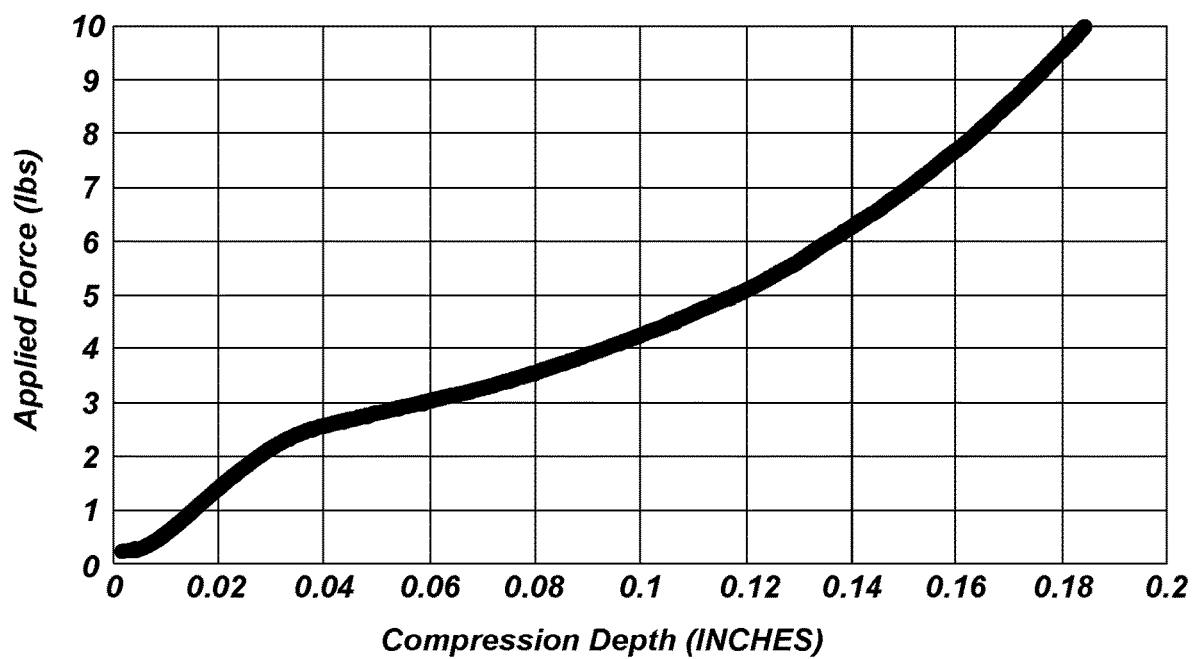
Figure 14:
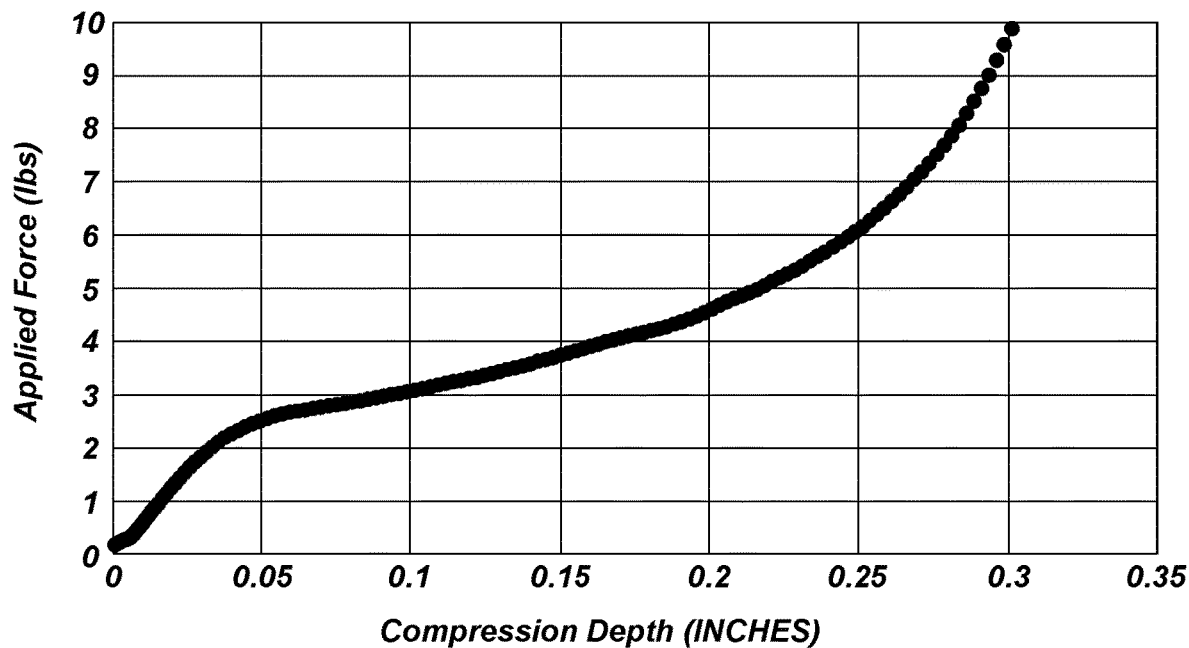
Figure 15:
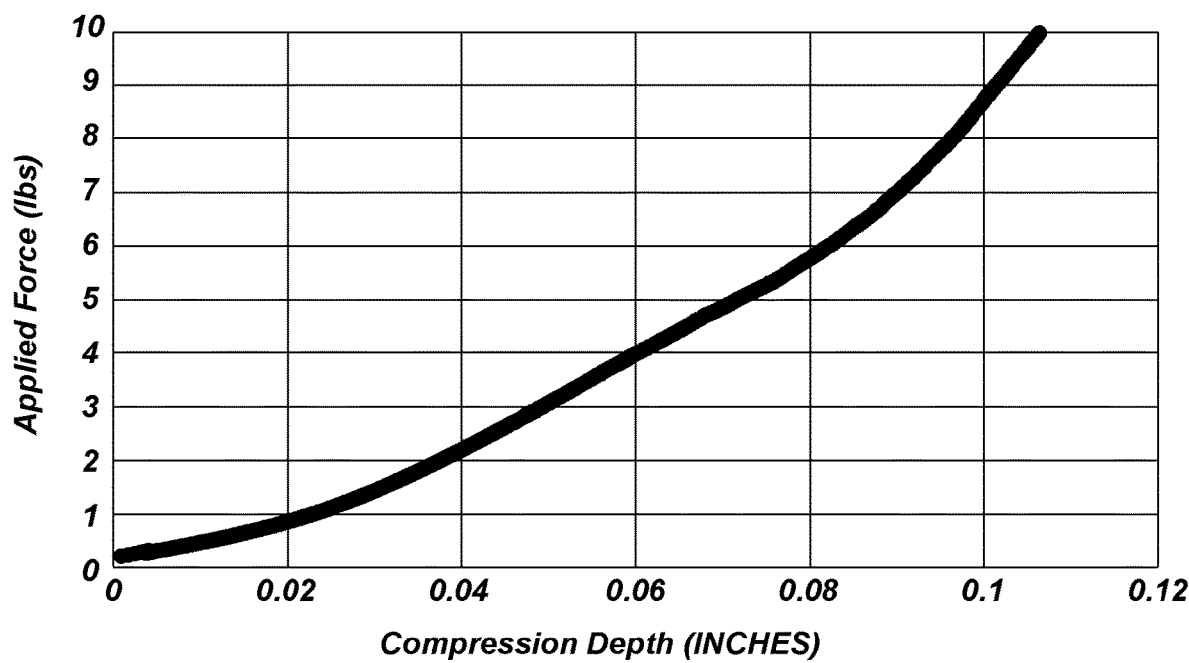
FIG. 15 and FIG. 16 are graphs illustrating test data obtained from insoles comprising gel.

FIG. 11 is a simplified drawing showing an insert 402 for a shoe insole 404. The insert 402 may be configured to be disposed within a slot or pocket 406 within the insole 404. The insert 402 may be modular, such that a different insert 402' may be used instead of or in addition to the insert 402. Inserts 402, 402' may be selected to have different thicknesses or different cushioning properties. The shape or cushioning properties of the insole 404 may be changed by exchanging one insert 402, 402' (or group thereof) for another. Thus, the insole 404 may be changed to accommodate different users or different applications (e.g., walking vs. running). Furthermore, a user may try different inserts 402, 402' as his or her leisure, and may change to different inserts 402, 402' as necessary to find a comfortable fit.

The inserts 402, 402' may be made partially or entirely of gel, as described above. In some embodiments, a portion of the insole 404 near the pocket 406 may also be made of gel, such that when the inserts 402, 402' are inserted into the pocket 406, the inserts 402, 402' tend to stick to the walls of the pocket 406. The tacky nature of the gel may prevent the inserts 402, 402' from slipping with respect to the pocket 406 once the insert 402 is placed into a shoe. In addition, the pliable nature of gel may enable the pocket 406 to accommodate different sizes of inserts 402, 402' effectively. One benefit of insoles 404 having modular inserts 402, 402' is that manufacturers and retailers can limit the number of unique packages (SKUs or stock keeping units), since a single package having multiple inserts 402, 402' can accommodate a wider variety of users than a single unitary insole.

EXAMPLES

Comparative Example 1: Conventional Insoles

FIGS. 12-16 illustrate test data obtained from various insoles having a thickness of about 3 mm. To obtain the data shown in FIGS. 12-14, three different commercially available memory-foam insoles were tested to determine the amount of force the insoles could support as a function of compression depth. The force was applied over an area of 0.75 square inches. In each case, an inflection point appears in the curve, indicating buckling of the material and a relatively abrupt change in how the insoles would feel in use.

Example 2: Formation and Use of a Mold

A mold was made by machining cavities into a lower plate (as an example, see the lower section 204 of the mold 206 shown in FIG. 4). An upper plate (as an example, see the upper section 202 of the mold 206 shown in FIG. 4) was made that when fitted to the lower plate completes the overall shape of the gel component to be formed and completes the cavities for the gel. A mixture of one part by weight SEPTON® 4055 SEEPS polymer and three parts by weight Carnation Oil (a 70-weight straight-cut white paraffinic mineral oil) were combined with 0.25% by weight IRGANOX® 1070 antioxidant (available from BASF Corp., of Iselin, NJ), 0.25% by weight IRGAFOS® 168 antioxidant (available from BASF Corp.), and 0.25% by weight Horizon Blue aluminum lake pigment (available from Day-Glo Color Corp., of Cleveland, OH). The mixture was passed through a heated extruder to melt-blend the material, then pumped into a piston heated above the melt temperature of the gel. A fabric was inserted between the two plates, which were temperature-controlled, and the plates were closed onto the fabric (see FIG. 5). The heated piston was connected to a heated pipe connected to a heated sprue-and-runner system in one of the plates to allow gel to flow into the cavities of the lower plate. The piston was driven forward so that the molten gel filled the cavities and permeated the fabric under pressure.

After the molten gel filled the mold cavity and penetrated into the fabric, the gel was cooled. The plates were separated (see FIG. 6), and the fabric with molded gel was lifted out of the mold.

Example 3: Gel Cushioning Insole

An insole was formed having similar dimensions as the insoles tested in Example 1. The insole was formed of a gel material about 3 mm thick using a mold as described in Example 2. The gel material had cylindrical voids approximately 2 mm in diameter, with a minimum distance y (see FIG. 3) of approximately 1.2 mm. The voids constituted approximately 33% of the volume of the insole in an undeformed state. The insole was subjected to the same test described in Example 1. The data depicted in FIG. 15 appear to lack an inflection point. Thus, the gel material of the insole appears to bulge, limiting the effect of any buckling that may occur.

Example 4: Gel Cushioning Insole

Figure 16:
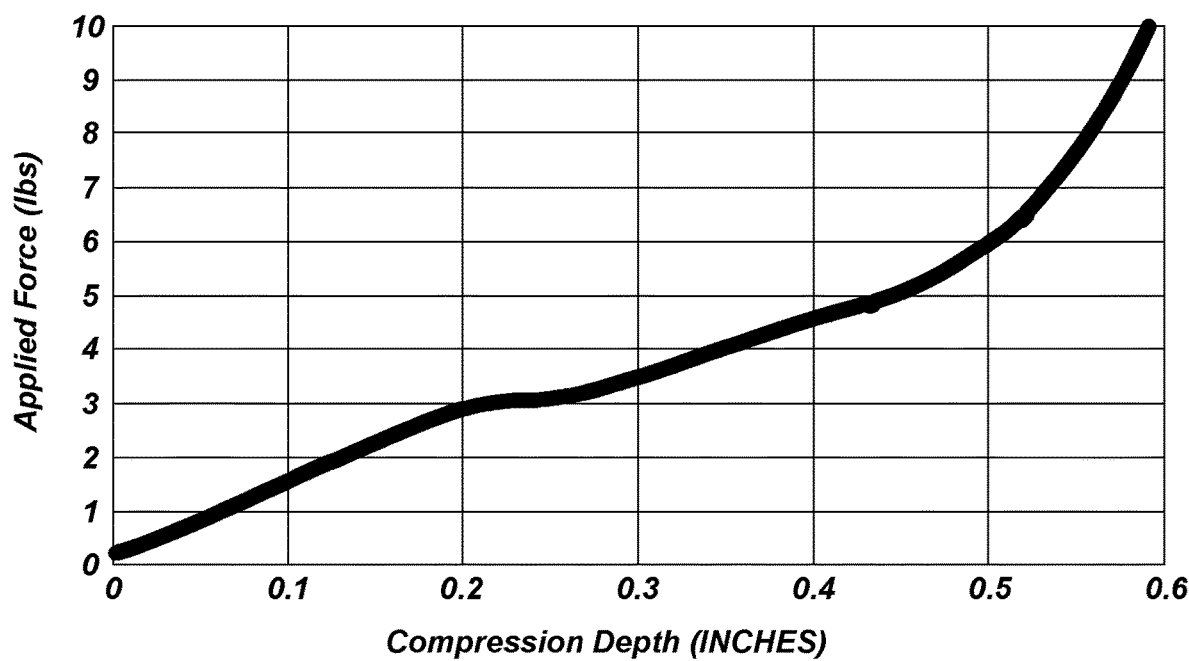

An insole was formed and tested as described in Example 3, except that the gel material was about 13 mm thick. The data depicted in FIG. 16 show an inflection point. This indicates that the gel material buckled. Without being bound to any particular theory, it appears that the thickness of the material, in combination with the other dimensions and properties of the gel, determines whether the gel material buckles. To avoid an abrupt change in the force applied to a user of the insole due to buckling, the thickness of the insole may be selected to be below a threshold at which the inflection point appears.

Again without being bound to any particular theory, it appears that the insole of Example 3 lacks an inflection point because the voids in the gel allow the gel room to bulge in different directions. In contrast, when gel is solid and constrained, it lacks a place to deform into as force is applied. Therefore, such a gel may feel hard and non-conforming, despite its soft, pliable nature. In Example 3, the gel can bulge on the outside, but the walls of the internal voids can also bulge into the surrounding voids, which may enable better cushioning by providing a space into which the gel can deform. Such internal deformation may occur even if the gel is constrained by a boundary on the outside. Conventional formed gel, or gel with molded-in voids (such as hollow columns or gaps between gel segments or gel with a geometric pattern embossed in) may be effective in cushioning, and may be less expensive than solid gel because less gel material may be used, but may not provide adequate force deflection when pressure is applied on a small surface area. In order to achieve adequate force deflection for small pressure points, the voids may be selected to be small enough and the walls thick enough that the walls cannot buckle before bulging into adjacent voids.

Buckling alone may be undesirable because at the point in time when the material collapses, the user feels an abrupt change in pressure. Furthermore, buckling material may bottom out at the time of collapse. Material that bulges may provide benefits such as pressure equalization, vibration attenuation, and shock absorption.

One property of a solid mass of gel (i.e., without voids) that may be desirable in some products is that residue, dirt, water/liquid, or other substances may be prevented from entering the gel component. This effect may be achieved with the gel materials having voids as described herein at least in part by adding a solid gel "skin" at the interface between the gel and a non-gel component, and the skin may be integrally formed with the remainder of the gel. In such a case, the skin may be the portion of the overall gel component which is interlocked with or overmolded onto the non-gel component.

In some embodiments, the molding of semi-buckling, semi-bulging gel or any other gel configuration with internal spaces or voids creates a pattern on the outside of an adjacent non-gel component. For example, round-holed semi-buckling, semi-bulging gel may create an aesthetically desirable design pattern that would enhance the branding or look of a shoe into which it is placed.

In some embodiments, the edge of a non-gel component may, even after trimming to final product dimensions, be encapsulated in gel, such as a gel border. This may be desirable from an aesthetic standpoint, and may have functional benefits (e.g., as discussed above with respect to a skin). The gel may be passed through or around the edges of the fabric and then trimmed, or the fabric may be trimmed before molding and located precisely in a mold by locating pins or other means.

The gel components may be in whole or in part waterproof, water resistant, and/or washable with or without soap/detergent by hand or machine.

The gel components may be of any color, and gels may be water-clear and effectively colorable by dyes and/or pigments.

The gel components may have members that extend laterally (e.g., parallel with the generally flat standing surface of an insole) through the voids within the gel. For example, there may be cross beams running diagonally from corner to corner that are not as thick as the hollow columns are tall, and these cross beams of gel may serve to stiffen or stabilize the insole so that the gel may have less tendency to deform in one direction under pressure, which may cause irritation to a human foot. The skins mentioned above in some embodiments may also effectively serve to stiffen the insole laterally, and may be considered as a laterally extending member as described in this paragraph.

Additional non limiting example embodiments of the disclosure are described below.

Embodiment 1: An insole for a shoe comprising an insole body comprising elastomeric material having a first major surface and a second major surface opposite the first major surface. A distance between the first major surface and the second major surface is between about 1 mm and about 10 mm. The elastomeric material defines a plurality of voids extending through the elastomeric material from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

Embodiment 2: The insole of Embodiment 1, wherein when a force is applied to the insole body in a direction perpendicular to the first major surface, a portion of the elastomeric material bulges to collapse voids in a vicinity of the applied force before the first major surface bottoms out against the second major surface.

Embodiment 3: The insole of Embodiment 1 or Embodiment 2, wherein the elastomeric material is coupled to another component having a material composition differing from a material composition of the elastomeric material.

Embodiment 4: The insole of Embodiment 3, wherein the body of elastomeric material is coupled to the another component by an adhesive.

Embodiment 5: The insole of Embodiment 3, wherein the elastomeric material is melt-bonded to the another component.

Embodiment 6: The insole of any of Embodiments 3 through 5, wherein the another component comprises a fabric.

Embodiment 7: The insole of any of Embodiments 1 through 6, wherein each void of the plurality has a major axis perpendicular to each of the first major surface and the second major surface.

Embodiment 8: The insole of any of Embodiments 1 through 7, wherein each void of the plurality has a uniform cross-sectional area in each plane parallel to each of the first major surface and the second major surface when the cushion is in an undeformed state.

Embodiment 9: The insole of any of Embodiments 1 through 8, wherein a volume of the voids is between about 25% and about 40% of a volume between the first major surface and the second major surface.

Embodiment 10: The insole of any of Embodiments 1 through 9, wherein a distance between the first major surface and the second major surface is between about 2 mm and about 3 mm.

Embodiment 11: The insole of any of Embodiments 1 through 10, wherein each void of the plurality has a dimension between about 1.5 mm and about 2.5 mm in a plane parallel to at least one of the first major surface and the second major surface.

Embodiment 12: The insole of any of Embodiments 1 through 11, wherein a minimum distance between adjacent voids of the plurality is between about 0.8 mm and about 1.5 mm.

Embodiment 13: The insole of any of Embodiments 1 through 12, wherein the elastomeric material comprises an A-B-A triblock copolymer.

Embodiment 14: The insole of Embodiment 13, wherein the elastomeric material further comprises a plasticizer.

Embodiment 15: The insole of Embodiment 14, wherein a ratio of a weight of the plasticizer to a weight of the triblock copolymer is from about 0.1 to about 50.

Embodiment 16: A shoe comprising an insole of any of Embodiments 1 through 15.

Embodiment 17: A method of forming an insole for a shoe, comprising providing an elastomeric material within a mold to form an insole body comprising elastomeric material having a first major surface and a second major surface opposite the first major surface. A distance between the first major surface and the second major surface is between about 1 mm and about 10 mm. Portions of the mold occupy a plurality of voids extending through the elastomeric material from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

Embodiment 18: The method of Embodiment 17, wherein providing an elastomeric material within a mold comprises injection molding the elastomeric material within the mold.

Embodiment 19: The method of Embodiment 17 or Embodiment 18, further comprising at least partially penetrating a fabric with the elastomeric material.

Embodiment 20: The method of any of Embodiments 17 through 19, further comprising solidifying the elastomeric material within the mold.

Embodiment 21: The method of Embodiment 20, further comprising melting at least a portion of the solidified elastomeric material and reusing the melted elastomeric material.

Embodiment 22: A shoe comprising: an insole body comprising a non-gel component and a gel component adjacent the non-gel component. The gel component comprises a body of elastomeric material having a first major surface and a second major surface opposite the first major surface. A distance between the first major surface and the second major surface is between about 1 mm and about 10 mm. The gel component defines a plurality of voids extending through the gel component from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

Embodiment 23: The shoe insole of Embodiment 22, wherein the gel component is disposed within a pocket within the body comprising the non-gel component.

Embodiment 24: The shoe insole of Embodiment 22 or Embodiment 23, wherein the non-gel component comprises poly ethylene-vinyl acetate.

Embodiment 25: The shoe insole of any of Embodiments 22 through 24, wherein the non-gel component comprises foam.

Embodiment 26: The shoe insole of any of Embodiments 22 through 25, further comprising a fabric over the non-gel component and the gel component.

Embodiment 27: The shoe insole of any of Embodiments 22 through 26, further comprising a scrim layer under the non-gel component and the gel component.

Embodiment 28: A cushioning element comprising a body of elastomeric material having a first major surface and a second major surface opposite the first major surface. A distance between the first major surface and the second major surface is between about 1 mm and about 10 mm. The elastomeric material defines a plurality of voids extending through the elastomeric material from the first major surface to the second major surface. Each void of the plurality has a dimension between about 1 mm and about 3 mm in a plane parallel to at least one of the first major surface and the second major surface. A minimum distance between adjacent voids of the plurality is between about 0.5 mm and about 3 mm.

Embodiment 29: A cushioning element comprising a body of elastomeric material having a first major surface and a second major surface opposite the first major surface. The elastomeric material defines a plurality of voids extending through the elastomeric material from the first major surface to the second major surface. When a force is applied to the cushioning element, the elastomeric material bulges to at least partially fill some of the voids, but does not buckle.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various cushion types and configurations.

What is claimed is:

1. An insole for a shoe, comprising:
   a substantially non-gel component; and
   a gel component comprising:
   a plasticizer extended A-B-A triblock copolymer having a first major surface and a second major surface opposite from the first major surface, the plasticizer extended A-B-A triblock copolymer defining a plurality of voids extending completely through the gel component, from the first major surface to the second major surface,
   a distance across each void of the plurality of voids measured in a plane parallel to at least one of the first major surface and the second major surface,
   a distance between adjacent voids of the plurality of voids, the plasticizer extended A-B-A triblock copolymer, and a thickness of the gel component designed to cause the plasticizer extended A-B-A triblock copolymer of the gel component to bulge into a void of the plurality of voids in a vicinity of a force of a load on an area of the gel component in a direction perpendicular to the first major surface and to limit buckling of the plasticizer extended A-B-A triblock copolymer of the gel component under the force of the load,
   wherein each void of the plurality of voids has a uniform cross-sectional area in each plane parallel to each of the first major surface and the second major surface when the gel component is in an undeformed state,
   wherein the gel component is disposed within a pocket of the substantially non-gel component, and
   wherein at least a portion of the pocket is made of the plasticizer extended A-B-A triblock copolymer and is at least partially in contact with the gel component disposed within the pocket.

2. The insole of claim 1, wherein the plasticizer extended A-B-A triblock copolymer is coupled to the substantially non-gel component, the substantially non-gel component apart from the portion of the pocket having a material composition differing from a material composition of the plasticizer extended A-B-A triblock copolymer.

3. The insole of claim 1, wherein a collective volume of the plurality of voids is about 25% to about 40% of a total volume between the first major surface and the second major surface.

4. The insole of claim 1, wherein a distance between the first major surface and the second major surface is about 2 mm to about 3 mm.

5. The insole of claim 1, wherein the distance across each void of the plurality of voids is about 1.5 mm to about 2.5 mm, as measured in a plane parallel to at least one of the first major surface and the second major surface.

6. The insole of claim 1, wherein the distance between adjacent voids of the plurality of voids is between about 0.8 mm and about 1.5 mm.

7. The insole of claim 1, wherein the plasticizer extended A-B-A triblock copolymer has a ratio of a weight of the plasticizer to a weight of the triblock copolymer of from about 0.1 to about 50.

8. A shoe, comprising:
an insole comprising a substantially non-gel component and a gel component adjacent the non-gel component, the gel component comprising a plasticizer extended A-B-A triblock copolymer and having a first major surface and a second major surface opposite from the first major surface, the gel component defining a plurality of voids extending completely through the gel component, from the first major surface to the second major surface,
a dimension of each void of the plurality of voids measured in a plane parallel to at least one of the first major surface and the second major surface, a minimum distance between adjacent voids of the plurality of voids, the plasticizer extended A-B-A triblock copolymer, and a thickness of the gel component causing the plasticizer extended A-B-A triblock copolymer to bulge under a force of a load on an area of the first major surface of the gel component and to limit buckling of the plasticizer extended A-B-A triblock copolymer of the gel component under the force of the load,
wherein each void of the plurality of voids has a uniform cross-sectional area in each plane parallel to each of the first major surface and the second major surface when the gel component is in an undeformed state,
wherein the gel component is disposed within a pocket of the substantially non-gel component, and
wherein at least a portion of the pocket is made of the plasticizer extended A-B-A triblock copolymer and is at least partially in contact with the gel component disposed within the pocket.

9. The shoe of claim 8, wherein the substantially non-gel component is formed from polyethylene-vinyl acetate.

10. The shoe of claim 8, wherein the substantially non-gel component comprises foam.

11. The shoe of claim 8, further comprising a fabric over the substantially non-gel component and the gel component.

12. The shoe of claim 8, further comprising a scrim layer under the substantially non-gel component and the gel component.

13. An insole for a shoe, comprising:
a substantially non-gel component; and
a gel component comprising:
a layer of a plasticizer extended A-B-A triblock copolymer having a first major surface and a second major surface opposite from the first major surface; and
a plurality of voids extending completely through the plasticizer extended A-B-A triblock copolymer, from the first major surface to the second major surface,
a maximum dimension across each void of the plurality of voids, a minimum distance between adjacent voids of the plurality of voids, and the plasticizer extended A-B-A triblock copolymer causing the plasticizer extended A-B-A triblock copolymer to bulge under a force of a load on an area of the first major surface of the gel component and to limit buckling of the plasticizer extended A-B-A triblock copolymer of the gel component under the force of the load,
wherein each void of the plurality of voids has a uniform cross-sectional area in each plane parallel to each of the first major surface and the second major surface when the gel component is in an undeformed state,
wherein the gel component is disposed within a pocket of the substantially non-gel component, and
wherein at least a portion of the pocket is made of the plasticizer extended A-B-A triblock copolymer and is at least partially in contact with the gel component disposed within the pocket.

14. The insole of claim 13, wherein the plasticizer extended A-B-A triblock copolymer is coupled to the substantially non-gel component, the substantially non-gel component having a material composition differing from a material composition of the plasticizer extended A-B-A triblock copolymer.

15. The insole of claim 13, wherein a collective volume of the plurality of voids is about 25% to about 40% of a total volume between the first major surface and the second major surface.

* * * * *